US007895266B2

(12) United States Patent
Oh et al.

(10) Patent No.: US 7,895,266 B2
(45) Date of Patent: Feb. 22, 2011

(54) DISTRIBUTED FILE SYSTEM AND METHOD OF REPLACING CACHE DATA IN THE DISTRIBUTED FILE SYSTEM

(75) Inventors: Seung-Taek Oh, Yongin-si (KR); Kyung-Sub Min, Seoul (KR); Sang-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 12/058,864

(22) Filed: Mar. 31, 2008

(65) Prior Publication Data
US 2009/0070461 A1 Mar. 12, 2009

(30) Foreign Application Priority Data
Sep. 7, 2007 (KR) .................. 10-2007-0091157

(51) Int. Cl.
*G06F 13/00* (2006.01)
(52) U.S. Cl. .................. 709/203; 709/217; 711/118; 711/133
(58) Field of Classification Search .............. 709/217, 709/223, 224, 203; 707/10, 201; 711/118, 711/133
See application file for complete search history.

(56) References Cited

U.S. PATENT DOCUMENTS

| 6,032,227 A * | 2/2000 | Shaheen et al. ............. 711/129 |
| 7,548,948 B2 * | 6/2009 | Klemets et al. ............. 709/203 |
| 2003/0115420 A1 | 6/2003 | Tsirigotis et al. |
| 2008/0250024 A1 * | 10/2008 | Kim et al. .................... 707/10 |

FOREIGN PATENT DOCUMENTS

| KR | 10-2001-0067820 A | 7/2001 |
| KR | 10-2002-0059324 A | 12/2002 |
| KR | 10-2003-0055482 A | 7/2003 |

* cited by examiner

*Primary Examiner*—Viet Vu
(74) *Attorney, Agent, or Firm*—Sughrue Mion, PLLC (57) ABSTRACT

Provided are a distributed file system and a method of replacing cache data in a distributed file system capable of replacing cache data based on the degree of network instability between a server and a client. The method includes monitoring network instability between the first apparatus and the second apparatus, determining whether an empty space exists in a storage space of the second apparatus if the second apparatus needs data of the first apparatus, if an empty space does not exist in the storage space, deleting at least one cache data item already stored in the second apparatus according to the monitored network instability, and storing data obtained from the first apparatus in the empty space generated by deleting the cache data.

8 Claims, 6 Drawing Sheets

| SERVER / CLIENT | SERVER A | SERVER B | SERVER C |
|---|---|---|---|
| CLIENT A | CONNECTED | DISCONNECTED | DISCONNECTED |

FIG. 3

| SERVER / CLIENT | SERVER A (1ST CACHE DATA MANAGEMENT) | SERVER B (2ND CACHE DATA MANAGEMENT) | SERVER C (3RD CACHE DATA MANAGEMENT) |
|---|---|---|---|
| CLIENT A | TWICE/HOUR | ONCE/HOUR | ZERO TIMES/HOUR |

DISTRIBUTED FILE SYSTEM AND METHOD OF REPLACING CACHE DATA IN THE DISTRIBUTED FILE SYSTEM

This application claims priority from Korean Patent Application No. 10-2007-0091157 filed on Sep. 7, 2007 in the Korean Intellectual Property Office, the disclosure of which is incorporated herein by reference in its entirety.

BACKGROUND OF THE INVENTION

1. Field of the Invention

Systems and methods consistent with the present invention relate to a distributed file system, and more particularly, to replacing cache data in a distributed file system capable of replacing cache data by considering the degree of network instability between a server and a client.

2. Description of the Related Art

In general, a distributed file system enables data in a server to be used as if the data is in a device of a user.

In the distributed file system, the server manages data required for operating a predetermined system, and the data is accessed by a client. Also, in the distributed file system, when the client uses the data managed by the server, the client stores the data in a cache memory of the client so that whenever the same data is used, the client can use the data without a need to access the server. In this distributed file system, when an empty space does not exist any more in the cache memory of the client, replacement of the data stored in the cache memory (hereinafter referred to as "cache data") is required.

Related art methods of replacing cache data in the distributed file system include a method of determining whether to replace the cache data based on the frequency of use of data or if the data has been recently used, and a method of determining whether to replace the cache data by examining the use sequence of data and thereby predicting data not to be used.

In a distributed file system operating in a wireless environment, a network between a server and a client may be disconnected at any time, and this situation is not considered in the conventional cache replacement methods.

That is, the distributed file system operating in an environment in which the network between the server and the client can be disconnected at any time should be able to operate without inconvenience even though the network is temporarily disconnected.

SUMMARY OF THE INVENTION

The present invention provides a distributed file system and a method of replacing cache data in a distributed file system capable of replacing cache data based on the degree of network instability between a server and a client.

According to an aspect of the present invention, there is provided a method of replacing cache data in a distributed file system including at least one first apparatus providing and managing data, and a second apparatus receiving the data from the first apparatus and storing and processing the data as cache data, the method including monitoring network instability between the first apparatus and the second apparatus, determining whether an empty space exists in a storage space of the second apparatus when the second apparatus needs data of the first apparatus, if an empty space does not exist in the storage space, deleting at least one cache data item already stored in the second apparatus according to the monitored network instability, and storing data obtained from the first apparatus in the empty space generated by deleting the cache data.

According to another aspect of the present invention, there is provided a distributed file system comprising at least one first apparatus providing and managing data, and a second apparatus receiving the data from the first apparatus and storing and processing the data as cache data, the system including a network monitoring unit monitoring the network instability between the first apparatus and the second apparatus, a cache replacement unit deleting at least one cache data item already stored in the second apparatus when the second apparatus needs data of the first apparatus and an empty space does not exist in a storage space of the second apparatus, according to the monitored network instability in order to generate a space for storing data obtained from the first apparatus.

BRIEF DESCRIPTION OF THE DRAWINGS

The above and other aspects of the present invention will become more apparent by describing in detail an exemplary embodiment thereof with reference to the attached drawings in which.

DETAILED DESCRIPTION OF EXEMPLARY EMBODIMENTS OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

The exemplary embodiments of the present invention are described hereinafter with reference to flowchart illustrations of a distributed file system and a method of replacing cache data in a distributed file system capable of replacing cache data by considering the degree of network instability between a server and a client, according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks. These computer program instructions may also be stored in a computer usable or computer-readable memory that can direct a computer or other programmable data processing apparatus to function in a particular manner, such that the instructions implement the function specified in the flowchart block or blocks. The computer program instructions may also be loaded onto a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

Figure 1:
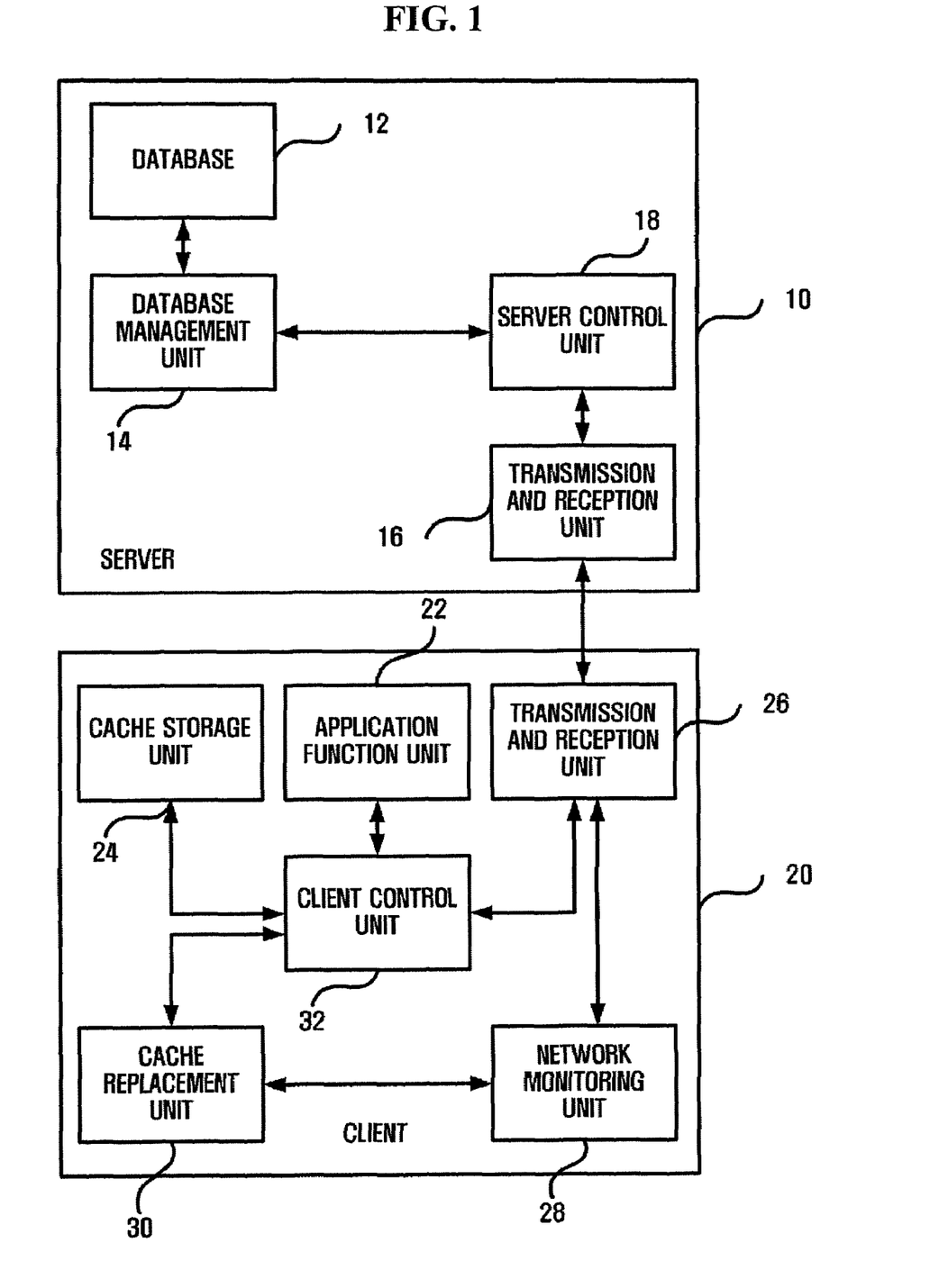
FIG. 1 is a block diagram illustrating a structure of a distributed file system according to an exemplary embodiment of the present invention.

FIG. 1 is a block diagram illustrating a structure of a distributed file system according to an exemplary embodiment of the present invention.

Referring to FIG. 1, the distributed file system includes a server 10 that provides data, and a client 20 that is communicably linked to the server 10 through a network, and requests the server 10 to transmit data through a network when necessary. In the current exemplary embodiment, one server 10 and one client 20 are illustrated, but at least one of the server 10 and the client 20 may be formed as multiple units.

The server 10 includes a database 12 in which a plurality of data items are stored, a database management unit 14 that manages the database 12, a transmission and reception unit 16 that transmits required information to and receives required information from the client 20, and a server control unit 18 that controls the database management unit 14 and the transmission and reception unit 16.

The database management unit 14 stores data managed in the server 10 in the database 12, and if the server control unit 18 requests the database management unit 14 to provide predetermined data, the database management unit 14 retrieves the data and provides the data to the server control unit 18.

The server control unit 18 receives a request from the client 20 through the transmission and reception unit 16 to transmit data managed in the database 12 of the server 10, and requests the database management unit 14 to provide the data. The server control unit 18 provides the data provided by the database management unit 14 to the client 20 through the transmission and reception unit 16.

Also, the server control unit 18 receives list information of data which is provided to the client 20, the list information being transmitted by the client 20. The server control unit 18 manages the received list information in the form of a table (hereinafter referred to as a "cache data table"). When the database management unit 14 updates the data in the database 12, the server control unit 18 receives information related to the update from the database management unit 14. Then, the server control unit 8 retrieves the cache data table, thereby determining whether the updated data exists in the client 20. If it is determined that the updated data exists in the client 20, the server control unit 18 transmits information related to the update to the client 20 through the transmission and reception unit 16.

The client 20 includes an application function unit 22, a cache storage unit 24, a transmission and reception unit 26, a network monitoring unit 28, a cache replacement unit 30, and a client control unit 32.

The application function unit 22 performs a function managing an application processor performing an application function. Also, when the application processor requires data managed in the server 10, the application function unit 22 makes a request for the data to the client control unit 32.

The cache storage unit 24 is an auxiliary storage device, and in order to increase input and output efficiency of a disk in particular, an area of a main memory is allocated to the cache storage unit 24 as a buffer area for storing recently used data. For example, a webpage requested by a user is stored in a cache directory in a hard disk. In this manner, when the user comes back to the page recently accessed, the web browser fetches the data from the cache directory instead of obtaining information from the original server 10 so that time can be saved and additional load to the network can be reduced.

Data managed in the server 10 is stored in this cache storage unit 24, and if no empty space exists in the cache storage unit 24, at least one of the stored items is deleted by the cache replacement unit 30 which will be explained later. In this case, the data can be deleted in units of blocks of the cache storage unit 24. The cache storage unit 24 may be implemented as software or as hardware such as a cache memory.

The transmission and reception unit 26 performs a role of transmitting required data to or receiving required data from the server 10.

The network monitoring unit 28 monitors the degree of network instability between the server 10 and the client 20. Here, the degree of network instability may include, but is not limited to, at least one of the connection state of a network, and the disconnection frequency of a network.

More specifically, the network monitoring unit 28 monitors the connection state of a network in real-time, and generates a list of the connection state of each of the servers 10 that can be connected to the client 20. Also, the network monitoring unit 28 may check the network disconnection frequency between the server 10 and the client 20, thereby generating a disconnection frequency list.

Figure 2:
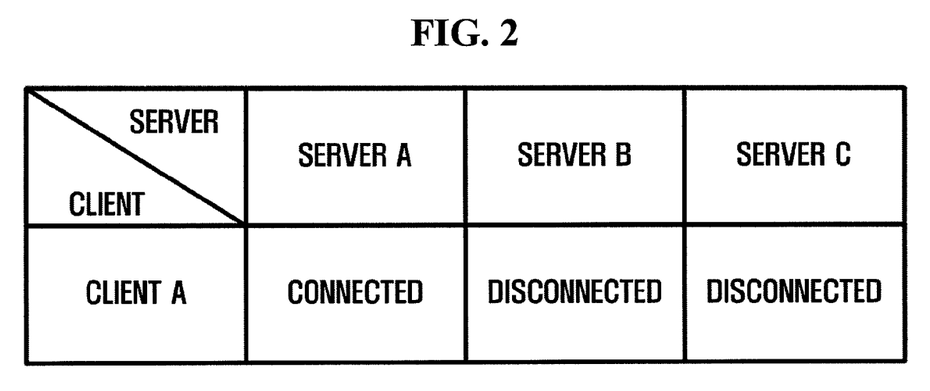
FIG. 2 is a diagram illustrating an example of a list of a network connection state between a server and a client according to an exemplary embodiment of the present invention.

FIG. 2 is a diagram illustrating an example of a list of a network connection state between the server 10 and the client 20 according to an exemplary embodiment of the present invention. Here, it is assumed that client A can access each of servers A, B, and C.

Referring to FIG. 2, client A and server A are currently connected through a network, client A and server B are currently not connected through a network, and client A and server C are currently not connected through a network.

Figure 3:
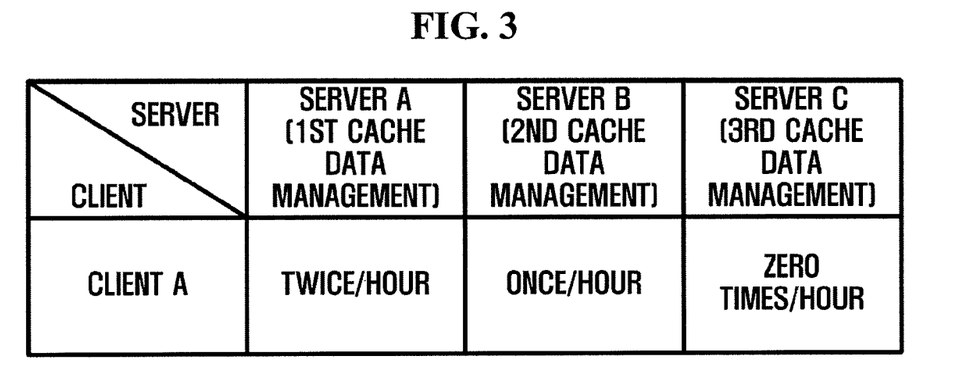
FIG. 3 is a diagram illustrating an example of a list of a network disconnection frequency between a server and a client according to an exemplary embodiment of the present invention.

FIG. 3 is a diagram illustrating an example of a list of a network disconnection frequency between the server 10 and the client 20 according to an exemplary embodiment of the present invention. Referring to FIG. 3, client A can access each of servers A, B, and C, and the disconnection frequency is twice per hour between client A and server A, once per hour between client A and server B, and zero times per hour between client A and server C.

The cache replacement unit 30 deletes predetermined data in the cache storage unit 24 according to the monitoring result of the network monitoring unit 28.

A more specific method of replacing cache data will be explained later with reference to FIGS. 5 and 6.

The client control unit 32 receives a request to transmit predetermined data, from the application function unit 22, and processes cache data stored in the cache storage unit 24 according to the request.

Figure 4:
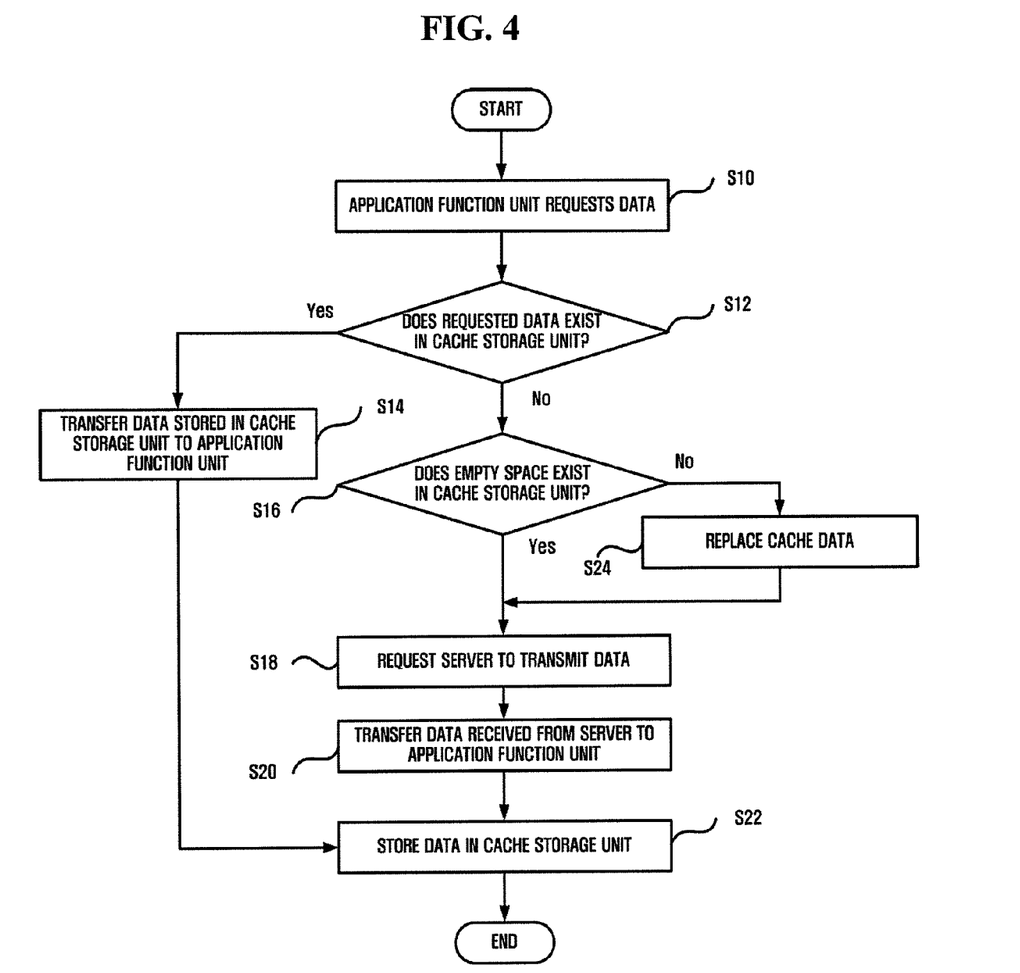
FIG. 4 is a flowchart illustrating a method of processing data requested by an application function unit according to an exemplary embodiment of the present invention.

More specifically, the client control unit 32 searches the cache storage unit 24 for the data requested from the application function unit 22 as illustrated in FIG. 4.

If the result of the searching indicates that the data requested by the application function unit 22 is stored in the cache storage unit 24 ("Yes" in operation S12), the client control unit 32 reads the data stored in the cache storage unit 24 and transfers the data to the application function unit 22 in operation S14. Then, the data is stored in the cache storage unit 24 in operation S22.

On the other had, if the result of the searching indicates that the data requested by the application function unit 22 is not stored in the cache storage unit 24 ("No" in operation S12), the client control unit 32 requests through the transmission and reception unit 26 the server 10 to transmit the data. In this case, the client control unit 32 first determines whether an empty space exists in the cache storage unit 24 in operation S16, and if it is determined that an empty space exists, the client control unit 32 requests the server 10 to transmit the data in operation S18. The client control unit 32 transfers the data received from the server 10 to the application function unit 22 in operation S20, and at the same time stores the data in the empty space of the cache storage unit 24 in operation S22.

If it is determined that an empty space does not exist in the cache storage unit 24 ("No" in operation S16), the client control unit 32 controls the cache replacement unit 30 to perform replacement of cache data in operation S24. Then, the client control unit 32 requests the server 10 to transmit the data in operation S18, and transmits the data received from the server 10 to the application function unit 22, while storing the data in the cache storage unit 24 in operation S22.

Then, the client control unit 32 generates list information of data stored in the cache storage unit 24, and then, transmits the generated list information to the server 10. Also, by using information related to an update transmitted from the server 10, the client control unit 32 updates the data stored in the cache storage unit 24.

Figure 5:
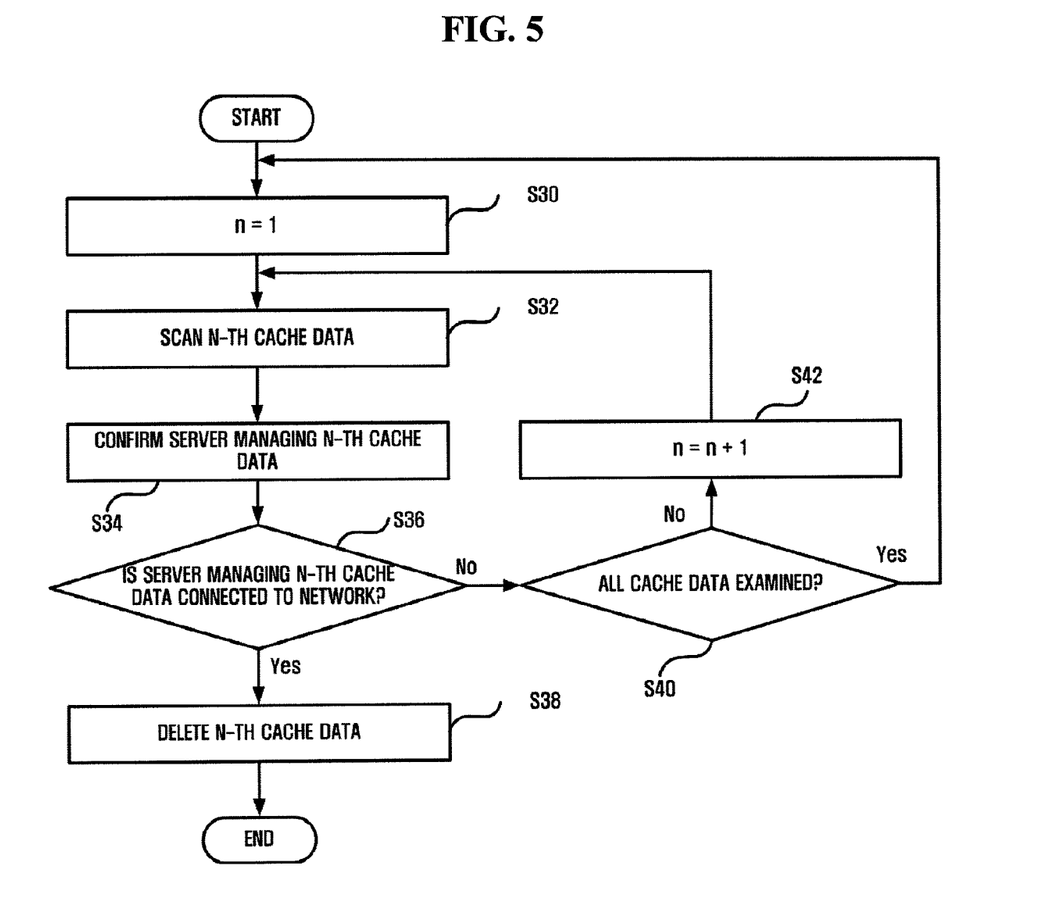
FIG. 5 is a flowchart illustrating a method of replacing cache data according to an exemplary embodiment of the present invention.

FIG. 5 is a flowchart illustrating a method of replacing cache data according to an exemplary embodiment of the present invention.

If the data requested by the application function unit 22 is not stored in the cache storage unit 24, the client control unit 32 determines whether an empty space exists in the cache storage unit 24 before requesting the server 10 to transmit the data. If an empty space does not exist in the cache storage unit 24, the client control unit 32 controls the cache replacement unit 30 to perform replacement of cache data.

The cache replacement unit 30 scans cache data items stored in the cache storage unit 24 one by one. A cache data item which is first scanned will be referred to as "first cache data", and cache data items which are scanned after the first cache data is scanned will be referred to as "second cache data", and so on. In this case, the scanning order may be based on the address order of the cache storage unit 24, or may be based on the order in which cache data is used by the client 20, or may be a preset arbitrary order. However, the scanning order is not limited to these orders.

First, the cache replacement unit 30 scans the first cache data in operations S30 and S32. The cache replacement unit receives information on the server 10 managing the scanned first cache data from the client control unit 32 in operation S34. Then, the cache replacement unit 30 determines whether the server 10 managing the first cache data is connected to the network based on a list on the connection state of a network which is provided by the network monitoring unit 28 in realtime, in operation S36.

If it is determined that the server 10 managing the first cache data is connected to the network, the first cache data is deleted in operation S38.

However, if it is determined that the server 10 managing the first cache data is disconnected from the network, it is determined whether the network connection state of each server 10 for all cache data items stored in the cache storage unit 24 has been examined in operation S40.

If it is determined that the network connection state of each server 10 for all cache data items stored in the cache storage unit 24 has been examined, from the process is performed again starting at operation S30. However, if it is determined that the network connection state of each server 10 for all cache data items stored in the cache storage unit 24 has not been examined, the second cache data is scanned in operations S42 and S32, and the server 10 managing the second cache data is confirmed in operation S34. Then, the cache replacement unit 30 repeats operations from operation S36.

For example, when it is assumed that the client 20 illustrated in the flowchart of FIG. 5 is client A as in the example illustrated in FIG. 2, and the server 10 managing the first cache data is server A, the cache replacement unit 30 determines that server A is connected to the network, and deletes the first cache data. However, if the server 10 managing the first cache data is server B, the cache replacement unit 30 determines that server B is disconnected from the network, and determines the network connection state of the server 10 managing the second cache data which is the next cache data item, and repeatedly performs the processes described above.

That is, the data that can be easily provided when necessary because of the server 10 being in a connected state is first replaced from among the cache data currently stored in the cache storage unit 24. In other words, while scanning cache data, if a data item whose server 10 is not disconnected from the network is found, the cache replacement unit 30 replaces that data item first.

Figure 6:
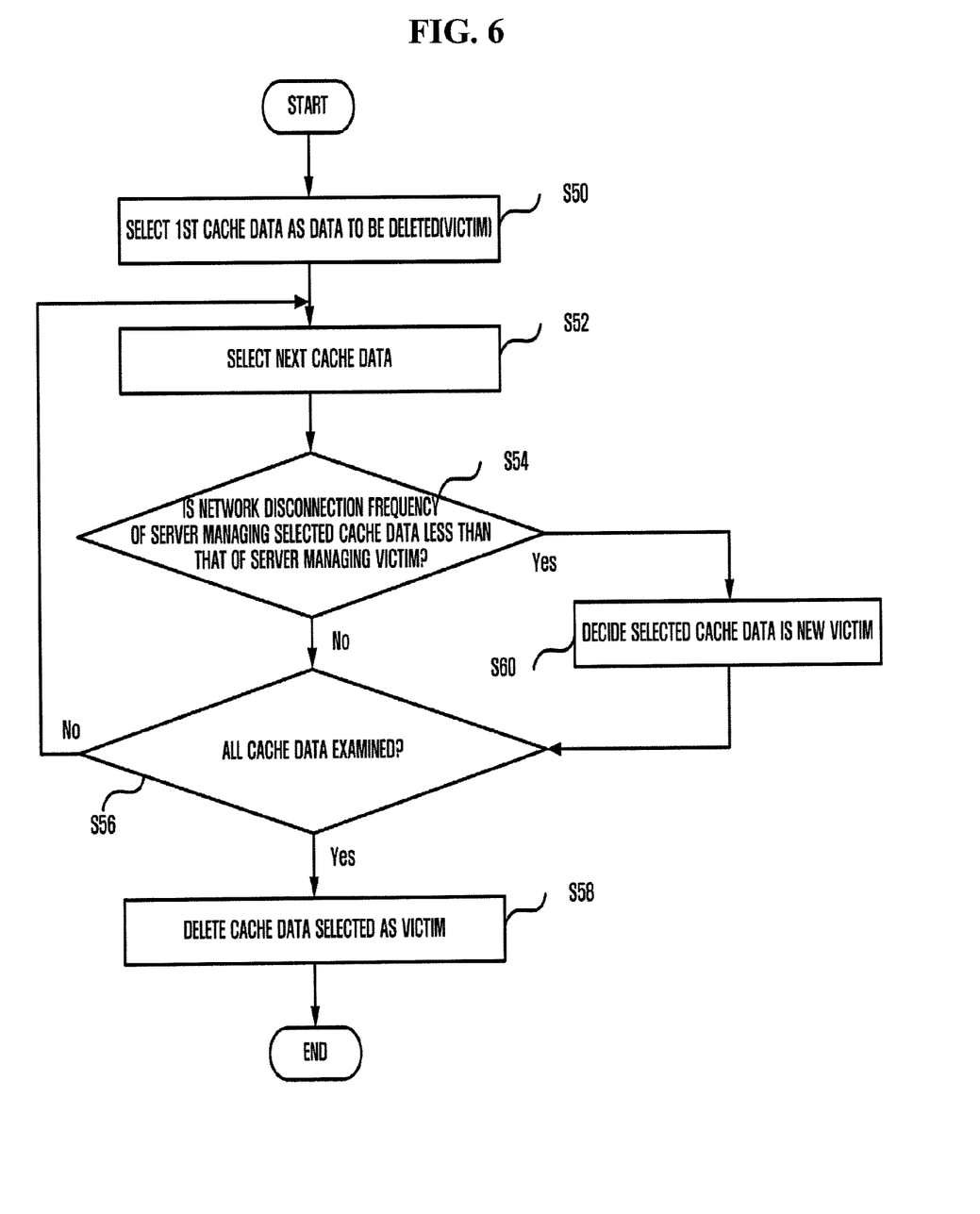
FIG. 6 is a flowchart illustrating a method of replacing cache data according to another exemplary embodiment of the present invention.

FIG. 6 is a flowchart illustrating a method of replacing cache data according to another exemplary embodiment of the present invention.

In FIG. 6, as in FIG. 5, the cache replacement unit 30 scans cache data items stored in the cache storage unit 24 one by one, and a cache data item which is first scanned will be referred to as "first cache data", a cache data item which is scanned after the first cache data is scanned will be referred to as "second cache data", and a cache data item which is scanned after the second cache data is scanned will be referred to as "third cache data", and so on.

First, the cache replacement unit 30 selects the first cache data stored in the cache storage unit 24 as cache data to be deleted (victim) in operation S50.

Then, the cache replacement unit 30 scans the second cache data in operation S52.

The cache replacement unit 30 compares the disconnection frequency between a server 10 managing the first cache data (hereinafter referred to as a "first server") and a network, with the disconnection frequency between a server 10 managing the second cache data (hereinafter referred to as a "second server") and the network in operation S54. Here, the network disconnection frequency can be confirmed through a disconnection frequency list provided by the network monitoring unit 28.

If the comparison result indicates that the network disconnection frequency of the second server is not less than that of the first server ("No" in operation S54), the cache replacement unit 30 determines whether all cache data stored in the cache storage unit 24 has been examined in operation S56. If it is determined that all cache data has been examined, the first cache data is deleted in operation S58. On the other hand, if it is determined that not all cache data has been examined, operation S52 is performed again to select next cache data.

If the network disconnection frequency of the second server is less than that of the first server ("Yes" in operation S54", the cache replacement unit 30 reselects the second cache data as cache data to be deleted in operation S60. Then, the cache replacement unit 30 determines whether all cache data stored in the cache storage unit 24 has been examined in operation S56, and if determined that all cache data has been examined, the second cache data is deleted in operation S58. However, if it is determined that not all cache data has been examined, operation S52 is performed again and next cache data is selected.

For example, in FIG. 3, the disconnection frequency between server C and the network is the lowest, and therefore the cache replacement unit 30 extracts the third cache data and deletes the data.

This cache data replacement can be implemented by simultaneously using the connection state of a current network and the disconnection frequency of the network, and can also be implemented by using conventional time orders of cache data use at the same time. For example, cache replacement may be implemented such that if the connection state of a network is a "connected state", the disconnection frequency of the network is "less than a reference value", and the cache data is least recently used, the probability that the cache data is selected as data to be deleted is high.

In the current exemplary embodiment, only the accessing by the application function unit 22 of the client 20 of the data managed by the server 10 is described. However, an application process of a server can also access data managed by a client when necessary through the same process as described above. Data access between a client and another client, or between a server and another server can also be performed through the same process as described above.

In this way, data obtained from a server which is frequently disconnected in a wireless network environment is kept longer in the cache storage unit, and therefore the present invention allows a user to work longer irrespective of network disconnection.

Also, since the amount of data transmission to a server having an instable network is reduced, and the amount of data transmission to a server having a stable network is increased, the overall system performance can be improved.

According to the distributed file system and the cache data replacement method of a distributed file system according to the present invention as described above, cache data can be replaced by considering instability of a network between a server and a client.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A method of replacing cache data in a distributed file system comprising at least one first apparatus which provides and manages data, and a second apparatus which receives the data from the first apparatus and stores and processes the data as cache data, the method comprising:

monitoring network instability between the first apparatus and the second apparatus, the network instability comprising one of a current connection state of the first apparatus to the network and a disconnection frequency of the first apparatus from the network;

determining whether an empty space exists in a storage space of the second apparatus if the second apparatus needs data of the first apparatus;

if it is determined that an empty space does not exist in the storage space, deleting at least one cache data item already stored in the second apparatus according to the monitored network instability; and storing data obtained from the first apparatus in the empty space generated by deleting the cache data.

2. The method of claim 1, wherein the distributed file system comprises a plurality of first apparatuses, and the deleting the at least one cache data item already stored in the second apparatus according to the monitored network instability comprises deleting at least one cache data item managed by one of the first apparatuses currently connected to the network.

3. The method of claim 1, wherein the distributed file system comprises a plurality of first apparatuses, and the deleting the at least one cache data item already stored in the second apparatus according to the monitored network instability comprises deleting at least one cache data item managed by the first apparatus having a network disconnection frequency which is equal to or less than a reference value.

4. The method of claim 3, wherein the deleting the at least one cache data item managed by the first apparatus having the network disconnection frequency which is equal to or less than the reference value comprises deleting at least one cache data item managed by the first apparatus having a lowest network disconnection frequency.

5. A distributed file system comprising:
at least one first apparatus which provides and manages data;
a second apparatus which receives the data from the first apparatus and stores and processes the data as cache data, the second device comprising:
a network monitoring unit which monitors network instability between the first apparatus and the second apparatus, the network instability comprising one of a current connection state of the first apparatus to the network and a disconnection frequency of the first apparatus from the network;
a cache replacement unit which deletes at least one cache data item already stored in the second apparatus if an empty space does not exist in a storage space of the second apparatus, according to the monitored network instability, to generate a space for storing the data received from the first apparatus.

6. The system of claim 5, further comprising a plurality of first apparatuses, wherein the cache replacement unit deletes at least one cache data item managed by one of the first apparatuses currently connected to the network.

7. The system of claim 5, wherein the distributed file system comprises a plurality of first apparatuses, and the cache replacement unit deletes at least one cache data item managed by the first apparatus having a network disconnection frequency which is equal to or less than a reference value.

8. The system of claim 7, wherein the cache replacement unit deletes at least one cache data item managed by the first apparatus having a lowest network disconnection frequency.

* * * * *